(12) United States Patent
Ishibashi et al.

(10) Patent No.: US 10,556,747 B2
(45) Date of Patent: Feb. 11, 2020

(54) CONVEYANCE DEVICE USING CARRIAGE

(71) Applicant: Daifuku Co., Ltd., Osaka (JP)

(72) Inventors: Masahiro Ishibashi, Osaka (JP); Yukichi Tamura, Osaka (JP); Shigeyuki Kusuhara, Osaka (JP); Shigeru Baba, Osaka (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 16/146,299

(22) Filed: Sep. 28, 2018

(65) Prior Publication Data

US 2019/0031444 A1 Jan. 31, 2019

Related U.S. Application Data

(63) Continuation of application No. PCT/JP2017/005826, filed on Feb. 17, 2017.

(30) Foreign Application Priority Data

Mar. 31, 2016 (JP) .................................. 2016-070921

(51) Int. Cl.
B65G 17/12 (2006.01)
B65G 17/00 (2006.01)
(Continued)

(52) U.S. Cl.
CPC ............ B65G 17/123 (2013.01); B61B 10/00 (2013.01); B65G 17/002 (2013.01); B65G 17/14 (2013.01); B65G 35/06 (2013.01)

(58) Field of Classification Search
CPC .... B65G 17/002; B65G 17/12; B65G 17/123; B65G 17/14; B65G 35/06; B61B 10/00
See application file for complete search history.

(56) References Cited

U.S. PATENT DOCUMENTS 2,512,356 A  6/1950 Massiello
3,850,106 A * 11/1974 Krivec ..................... B61B 9/00
                                                    104/127
(Continued)

FOREIGN PATENT DOCUMENTS

JP         S5942753 U    3/1984
JP         S61252031 A   11/1986
              (Continued)

*Primary Examiner* — Gene O Crawford
*Assistant Examiner* — Keith R Campbell
(74) *Attorney, Agent, or Firm* — St. Onge Steward Johnston & Reens LLC

(57) ABSTRACT

A conveyance device has a drive route part wherein conveyance carriages travel at predetermined intervals, which is connected to a storage route part having a drive conveyer chain that supports the conveyance carriages for free travel. The drive route part has a drive conveyer chain including spaced carriage propulsion claw parts. The conveyance carriages have moved pins that horizontally extends in the left/right direction and which are freely detached/re-fitted in the up/down direction with the carriage propulsion claw parts. The conveyance device has a carriage-positioning mechanism which positions a conveyance carriage at a fixed position wherein the moved pin is positioned immediately before a guide ring for a corresponding one of the carriage propulsion claw parts, and has a carriage pushing-out mechanism which pushes out the conveyance carriage positioned at the fixed position, at a timing when the moved pin is fitted to the carriage propulsion claw part.

9 Claims, 11 Drawing Sheets

(51) Int. Cl.
*B65G 17/14* (2006.01)
*B61B 10/00* (2006.01)
*B65G 35/06* (2006.01)

(56) References Cited

U.S. PATENT DOCUMENTS

| | | | | |
|---|---|---|---|---|
| 9,796,531 | B2 * | 10/2017 | Ishibashi | B65G 17/18 |
| 9,969,557 | B2 * | 5/2018 | Ishibashi | B65G 17/002 |
| 10,087,007 | B2 * | 10/2018 | Ishibashi | B65G 17/123 |

FOREIGN PATENT DOCUMENTS

| JP | H0985336 A | | 3/1997 |
|---|---|---|---|
| JP | 2011079624 A | * | 4/2011 |
| JP | 2011079624 A | | 4/2011 |
| JP | 2014005114 A | | 1/2014 |

\* cited by examiner

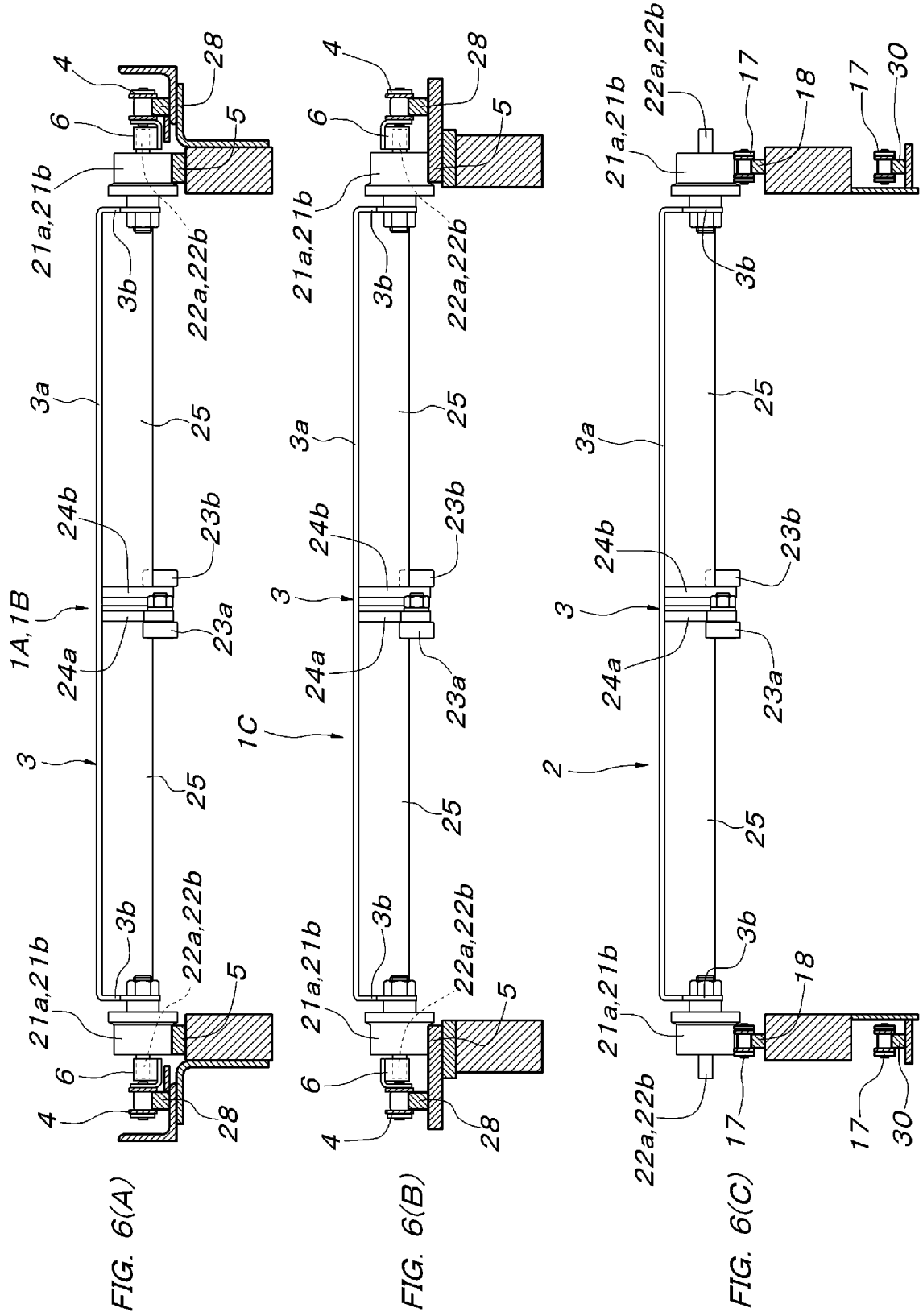

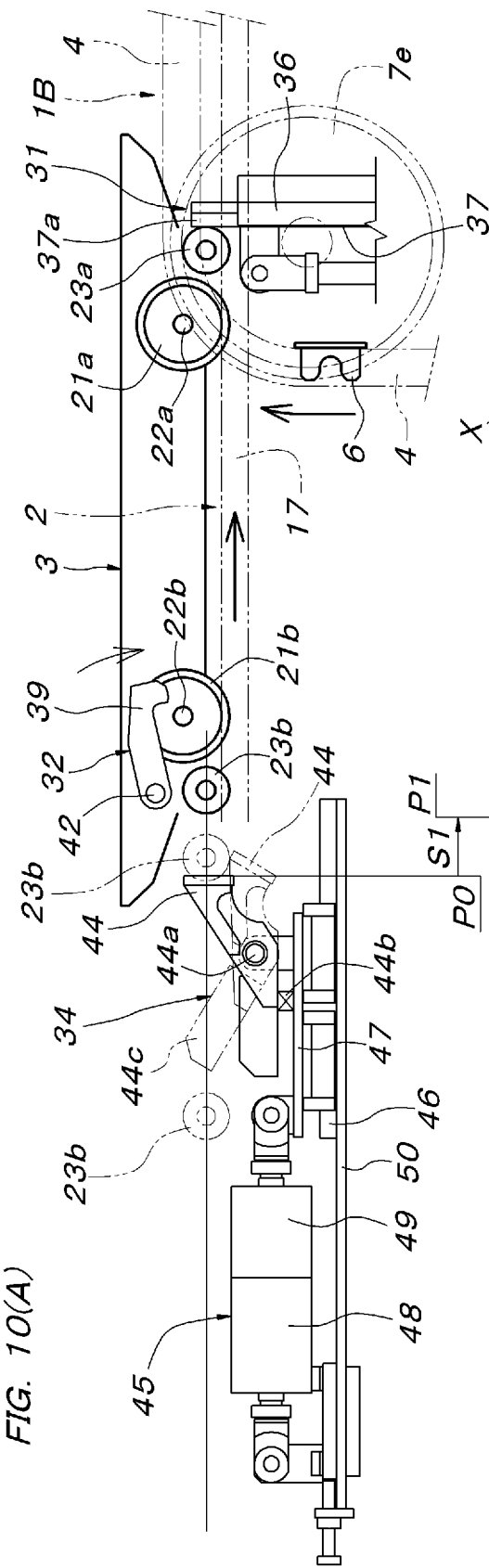
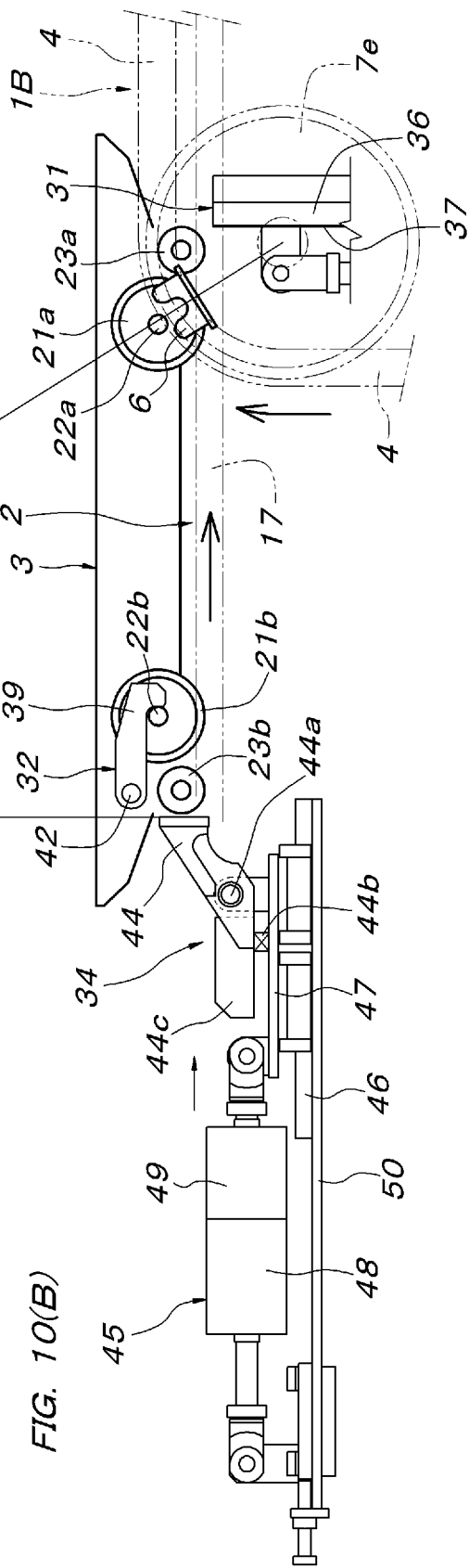
FIG. 10(A)
FIG. 10(B)

CONVEYANCE DEVICE USING CARRIAGE

FIELD OF THE INVENTION

The present invention relates to a conveyance device using a carriage which includes a horizontal travel route of a conveyance carriage that supports and conveys a conveyed object.

BACKGROUND OF THE INVENTION

As this type of conveyance device, a conveyance device in which a storage route part for storing (temporarily stopping) a conveyance carriage and a drive route part for causing the conveyance carriage fed out from the storage route part to be forcibly driven to travel at set intervals are provided has been known in, for example, Japanese Published Unexamined Patent Application No. 2011-79624 (Patent Literature 1), etc. In the configuration disclosed in Japanese Published Unexamined Patent Application No. 2011-79624 described above, the storage route part is formed with a drive conveyor chain which includes a roller for supporting the conveyance carriage such that the conveyance carriage freely travels, and a stopper which receives and stops the conveyance carriage at a terminal end of the storage route part, and the drive route part is formed with a pair of left and right guide rails which support, via a wheel, the conveyance carriage such that the conveyance carriage freely travels, and a pair of left and right drive cord-like bodies that include, at regular intervals, carriage propulsion claw parts to which a driven pin provided in the conveyance carriage is fitted so as to be freely fitted/detached in an up/down direction.

SUMMARY OF THE INVENTION

In the configuration described in Patent Literature 1 described above, by releasing the stopper which receives the conveyance carriage at the terminal end of the storage route part, the conveyance carriage which becomes free is fed into the drive route part on the downstream side due to the function of the drive conveyor chain supporting the conveyance carriage. Therefore, it is considered that, if the stopper is released at a timing when the driven pin of the conveyance carriage fed into the drive route part is fitted into the carriage propulsion claw part that is turned around a guide ring present at a beginning end position of the drive route part, an initial purpose is achieved. However, in actuality, the conveyance carriage which becomes free starts to move as the drive conveyor chain supporting the conveyance carriage via the roller moves, and thus, there is a time delay after the release of the stopper until the start of the movement of the conveyance carriage at rest, a time delay until the conveyance carriage reaches a predetermined speed, and the like, and the time delay is varied even by the weight of a conveyed object loaded on the conveyance carriage. Therefore, it is very difficult to reliably fit the driven pin of the conveyance carriage into the carriage propulsion claw part which turns at a constant speed.

The present invention proposes a conveyance device using a carriage which can solve the conventional problem as described above, and for ease of understanding of a relationship with an embodiment which will be described later, the conveyance device using a carriage according to the present invention will be shown with reference signs which are used in the description of the embodiment and which are placed in parentheses. In a conveyance device which is configured such that, in a horizontal travel route of a conveyance carriage (3), a storage route part (2) for storing the conveyance carriages (3) in a state where the conveyance carriages (3) are adjacent in a forward/backward direction and a drive route part (1B) for causing the conveyance carriages (3) fed out from the storage route part (2) to be forcibly driven to travel at set intervals are provided, in which the storage route part (2) is formed with drive conveyor chains (17) that support, via wheels (21*a*, 21*b*) of the conveyance carriage (3), the conveyance carriage (3) such that the conveyance carriage (3) freely travels, in which the drive route part (1B) is formed with guide rails (5) that support, via the wheels (21*a*, 21*b*), the conveyance carriage (3) such that the conveyance carriage (3) freely travels, and drive cord-like bodies (drive conveyor chains (4)) that include, at regular intervals, carriage propulsion claw parts (6) into which driven pins (22*a*) provided in the conveyance carriage (3) and directed laterally horizontally are fitted such that the moved pins (22*a*) are freely fitted and detached into and from the carriage propulsion claw parts (6) and in which the driven pins (22*a*) of the conveyance carriage (3) that is fed from the storage route part (2) into the drive route part (1B) with predetermined timing can be fitted into the carriage propulsion claw parts (6) that are turned around guide rings (7*e*) at a beginning end position of the drive route part (16), a carriage positioning means (32, 44) in which the driven pins (22*a*) of the conveyance carriage (3) position, at a fixed position directly before a turning route around the guide rings (7*e*) of the carriage propulsion claw parts (6), the conveyance carriage (3) in a state where the conveyance carriage (3) is prevented from being moved forward and backward and in which the positioning is freely released and a carriage pushing-out means (34) which pushes out the conveyance carriage (3) at the fixed position at a timing when the driven pins (22*a*) are fitted into the carriage propulsion claw parts (6) are provided separately from the drive conveyor chains (17) of the storage route part (2).

In the configuration of the present invention described above, the positioning of the conveyance carriage at the fixed position by the carriage positioning means is released and simultaneously, the carriage pushing-out means is operated such that the conveyance carriage which is stopped at the fixed position is forcibly fed out from the storage route part to the downstream side drive route part, therefore, a required time after a point in time at which the carriage pushing-out means is operated until the driven pins of the conveyance carriage reach the inside of the turning route of the carriage propulsion claw parts is determined by the pushing-out speed of the carriage pushing-out means, with the result that the required time is substantially constant although such required time is an extremely short period of time. Therefore, at a point in time at which the carriage propulsion claw parts reach a fixed position by a distance corresponding to the required time in front thereof from a position at which the carriage propulsion claw parts of the drive route part intersect the entrance route of the driven pins of the conveyance carriage, the positioning of the conveyance carriage at the fixed position is released and simultaneously, the carriage pushing-out means is operated, with the result that the driven pins of the conveyance carriage fed out toward the drive route part can be pushed into the carriage propulsion claw parts of the drive route part so as to be reliably fitted thereinto. As described above, in the configuration of the present invention, the conveyance carriage which is temporarily stopped within the storage route part is fed into the downstream side drive route part and is synchronized with the carriage propulsion claw parts of the drive route part, and thus the conveyance carriage can be driven to travel in the drive route part. As a matter of course, the travel interval between the conveyance carriages in the downstream side drive route part can also be freely set.

Although in a case where the present invention is implemented, the carriage positioning means can also be formed with a combination of a front stopper which receives the conveyance carriage at the fixed position and a rear anti-back stopper which allows the passage of the conveyance carriage but which automatically returns after the passage, in this configuration, the interval between the front stopper and the rear anti-back stopper is longer than the length of a portion sandwiched between both the front and rear stoppers on the side of the conveyance carriage, with the result that play in the forward/backward direction of the conveyance carriage positioned at the fixed position is enlarged. By contrast, the carriage positioning means is formed with a stopper (32) which freely switches between an action position for restraining the forward movement of the conveyance carriage (3) and a non-action position for allowing the forward movement of the conveyance carriage (3), and a pusher (44) which pushes the conveyance carriage (3) from the rear so as to position the conveyance carriage (3) between the pusher (44) and the stopper (32) in the action position, with the result that the play in the forward/backward direction of the conveyance carriage positioned at the fixed position can be substantially eliminated. Therefore, the stopper for restraining the forward movement of the conveyance carriage is switched to the non-action position and simultaneously, the carriage pushing-out means is operated, and thus the timing at which the conveyance carriage is pushed out is made to match the timing at which the carriage pushing-out means is operated, with the result that the driven pins of the conveyance carriage fed out from the storage route part can be more reliably fitted into the carriage propulsion claw parts of the downstream side drive route part.

In a case where the pusher (44) as described above is used together in the carriage positioning means, the pusher (44) is formed such that the pusher (44) can be moved forward from a first forward limit position (P1) for positioning the conveyance carriage (3) at the fixed position between the pusher (44) and the stopper (32) in the action position to a second forward limit position (P2) for pushing out the conveyance carriage (3) from the fixed position in a state where the stopper (32) is switched to the non-action position, and thus the pusher (44) can be made to also serve as the carriage pushing-out means (34). In this configuration, by only making one pusher perform a two-stage operation, the pusher can be made to serve both as the pusher for the carriage positioning means and the pusher for the carriage pushing-out means, and one to-be-pressed portion can be made to serve as to-be-pressed portions necessary for the side of the conveyance carriage, with the result that the structure is made simple such that the present embodiment can be implemented inexpensively.

Although the stopper can also be formed with one stopper for receiving the center portion of the conveyance carriage in the left/right width direction, it is preferable that a pair of left and right stoppers (32) are provided to receive two left and right portions on the rear end side of the conveyance carriage (3). In this configuration, the conveyance carriage can be stopped so as to be accurately directed toward the front, it is therefore possible to smoothly perform the subsequent transfer of the conveyance carriage to the drive route part. In this case, in each of the wheels (21a, 21b) respectively provided as left and right pairs in two front and rear portions of the conveyance carriage (3), pins (22a, 22b) are provided so as to protrude outward and concentrically, pins (22a) which are provided so as to protrude from the pair of left and right wheels (21a) on the front side can be used as the driven pins, and pins (22b) which are provided so as to protrude from the pair of left and right wheels (21b) on the rear side can be used as targets with which the pair of left and right stoppers (32) are engaged. As a matter of course, an auxiliary stopper (31) which receives a center portion in the left/right width direction of the conveyance carriage (3) on the front end side can also be provided separately from the pair of left and right stoppers. With the auxiliary stopper, it is possible to obtain an effect as a safety measure when the operation of the pair of left and right stoppers on the rear side becomes unstable, and furthermore, the auxiliary stopper can be switched to the action position before the pair of left and right stoppers on the rear side to stop the conveyance carriage, and thereafter the pair of left and right stoppers on the rear side can be switched to the action position and thus it is possible to position the conveyance carriage at the fixed position without the conveyance carriage colliding against the pair of left and right stoppers on the rear side.

In actuality, a use form can be considered in which, the drive cord-like bodies (the drive conveyor chains (4)) of the drive route part are detoured by the total length of the storage route part (2) and installing the storage route part (2) in a place where the drive cord-like bodies (the drive conveyor chains (4)) are detoured, the conveyance carriage that is driven to travel in the upstream side drive route part of the storage route part (2) is again fed into the storage route part and is temporarily stopped and thereafter the conveyance carriage is fed out from the storage route part to the downstream side drive route part with arbitrary timing. It is configured such that, in this case, in a state where the wheels (21a) of the conveyance carriage (3) which reach the terminal end portion of the drive route part (1A) on the upstream side of the storage route part (2) are supported on the drive cord-like bodies (the drive conveyor chains (4)) of the storage route part (2), the carriage propulsion claw parts (6) which are turned around guide rings (7b) at the terminal end of the upstream side drive route part (1A) are detached from the driven pins (22b) of the conveyance carriage (3).

In addition, in the conveyance carriage (3), rollers (23a, 23b) which are pivotally supported with support shafts that are directed laterally horizontally are provided in the center portions of two front and rear portions in the left/right width direction of the bottom portion thereof, and a support guide plate (35) is placed which supports the conveyance carriage (3) via the rollers (23a, 23b) while the wheels (21a, 21b) of the conveyance carriage (3) disengaged from the tops of the drive cord-like bodies (the drive conveyor chains (4)) of the storage route part (2) are transferred onto the guide rails (5) of the storage route part (16), with the result that the conveyance carriage can safely and smoothly transfer onto the downstream side drive route part from the storage route part. As described previously, in a case where the storage route part (2) is provided partway through the drive route part (1A, 1B), the rollers (23a, 23b) which are pivotally supported with the support shafts that are directed laterally horizontally are provided in the center portions of the two front and rear portions in the left/right width direction of the bottom portion of the conveyance carriage (3), and thus a support guide plate (29) can be placed which supports the conveyance carriage (3) via the rollers (23a, 23b) while the wheels (21a, 21b) of the conveyance carriage (3) disengaged from the tops of the guide rails (5) of the upstream side drive route part (1A) are transferred onto the drive cord-like bodies (the drive conveyor chains (4)) of the storage route part (2). In a case where the rollers (23a, 23b) are provided in the two front and rear portions as described above, it is configured such that the carriage pushing-out means (34) can be formed so as to push out the conveyance carriage (3) via the rollers (23b) on the rear side.

BRIEF DESCRIPTION OF THE DRAWINGS

FIG. 6A is a vertical cross-sectional front view showing the conveyance carriage in an upstream side drive route part in the drive route part, FIG. 6B is a vertical cross-sectional front view showing the conveyance carriage in a downstream side return route part in the drive route part, and FIG. 6C is a vertical cross-sectional front view showing the conveyance carriage in the storage route part.

FIG. 10A is a side view showing a first stage when the conveyance carriage is positioned so as to be stopped in a terminal end fixed position of the storage route part and FIG. 10B is a side view showing a second stage thereof.

DETAILED DESCRIPTION OF THE INVENTION

Figure 1A:
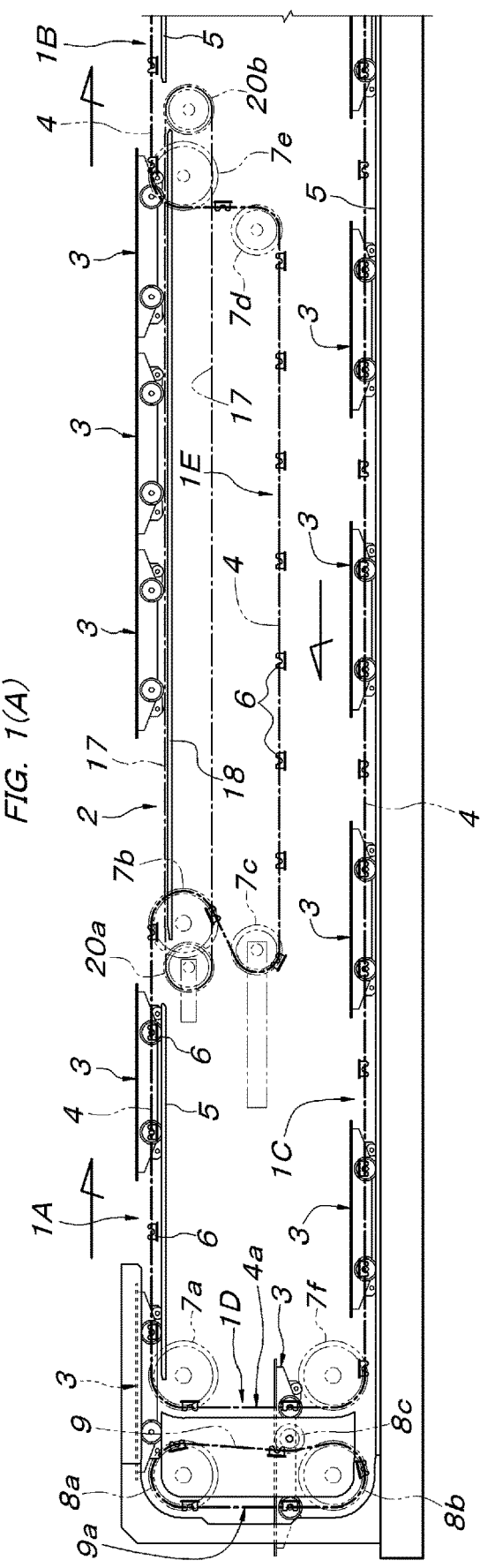
FIG. 1A is a side view showing a main part of a conveyance device which adopts the configuration of an embodiment of the present invention.
Figure 1C:
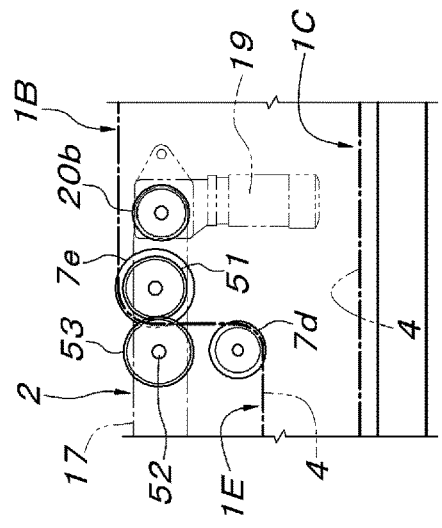
FIG. 1C is a side view showing a terminal end portion of a storage route part.

An embodiment of the present invention will be described below with reference to accompanying drawings. In FIGS. 1 to 4, reference sign 1A denotes an upstream side drive route part, reference sign 1B denotes a downstream side drive route part, and reference sign 2 denotes a storage route part arranged horizontally between the upstream side drive route part 1A and the downstream side drive route part 1B, and a horizontal conveyance route of a conveyance carriage 3 is formed with the upstream side drive route part 1A, the storage route part 2, and the downstream side drive route part 1B that are horizontally continuous. Reference sign 10 denotes a return drive route part, communicates with the downstream side of the downstream side drive route part 1B and is arranged horizontally directly below the upstream side drive route part 1A and the storage route part 2. The return drive route part 10 is connected via a rising route part 1D to the beginning end portion of the upstream side drive route part 1A. Although the upstream side drive route part 1A and the downstream side drive route part 1B are connected via a horizontal detour route part 1E which detours directly below the storage route part 2, the upstream side drive route part 1A and the downstream side drive route part 1B may be independently formed and individually driven.

Figure 1B:
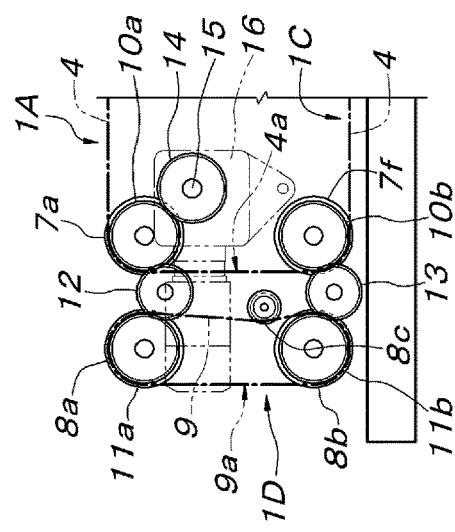
FIG. 1B is a side view showing a drive-train of a rising route part thereof.
Figure 2:
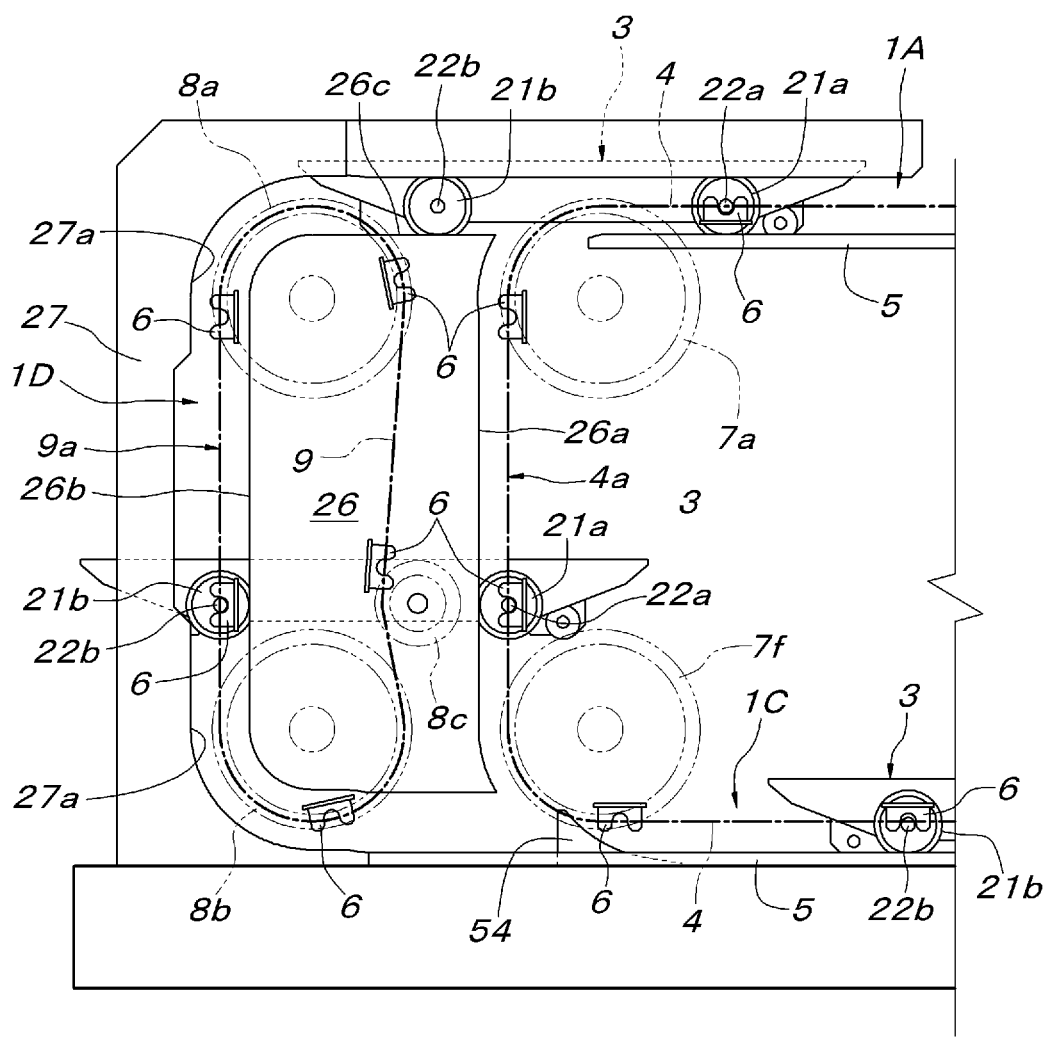
FIG. 2 is an enlarged view of the rising route part in FIG. 1A.

The horizontal detour route part 1E, the downstream side drive route part 1B, and the return drive route part 10 from the upstream side drive route part 1A are formed with a pair of left and right drive conveyor chains 4 serving as drive cord-like bodies and a pair of left and right guide rails 5 which support a conveyance carriage 3 such that the conveyance carriage 3 can travel, and carriage propulsion claw parts 6 are attached to the pair of left and right drive conveyor chains 4 at regular intervals. The rising route part 1D is formed with a vertical route part 4a of the pair of left and right drive conveyor chains 4 ranging from a guide ring 7f at the terminal end of the return drive route part 10 to a guide ring 7a at the beginning end of the upstream side drive route part 1A, and a vertical route part 9a, on the far side from the drive conveyor chains 4, of a pair of left and right drive conveyor chains 9 that are placed between guide rings 8a and 8b parallel to the guide rings 7a and 7f and that have the same structure as the drive conveyor chains 4. The guide rings 7a and 8a on the upper side which are present at the same height are coupled in an interlocking manner so as to rotate in the same direction as each other by spur gears 10a and 11a rotating together with the respective guide rings 7a and 8a and an intermediate spur gear 12 engaging with both the spur gears 10a and 11a. The guide rings 7b and 8b on the lower side which are present at the same height are coupled in an interlocking manner so as to rotate in the same direction as each other by spur gears 10b and 11b rotating together with the respective guide rings 7b and 8b and an intermediate spur gear 13 engaging with both the spur gears 10b and 11b. A speed reducer equipped motor 16 is provided which drives and rotates one drive shaft 15 that includes a pair of left and right drive gears 14 engaging with the pair of left and right spur gears 10a on the upper side. Therefore, it is configured such that the speed reducer equipped motor 16 is operated so as to drive and rotate the pair of left and right drive gears 14 via the drive shaft 15, and thus the pairs of left and right drive conveyor chains 4 and 9 rotate in an interlocking manner such that the vertical route parts 4a and 9a thereof move upward at the same speed. As shown in FIGS. 1B and 2, in the pair of left and right drive conveyor chains 9, a chain tensioning guide ring 8c is additionally provided in order to individually provide tension to each of the drive conveyor chains 9.

The drive conveyor chains 4 which are driven in this way are guided by the guide ring 7a at the beginning end of the upstream side drive route part 1A and the guide ring 7b at the terminal end thereof, a guide ring 7c at the beginning end of the horizontal detour route part 1E, a guide ring 7d at the terminal end thereof and a guide ring 7e at the beginning end of the downstream side drive route part 1B, and an unillustrated guide ring at the terminal end of the downstream side drive route part 1B so as to turn horizontally around the upstream side drive route part 1A, the horizontal detour route part 1E, and the downstream side drive route part 1B. Thereafter, the drive conveyor chains 4 are guided by a guide ring (unillustrated) at the beginning end of the return drive route part 10 and the guide ring 7f at the terminal end thereof so as to turn horizontally around the return drive route part 10 and turn around a return circulation route. The guide ring 7c at the beginning end of the horizontal detour route part 1E serves as a chain tensioning guide ring which adjusts the tension of the drive conveyor chains 4 to be guided. It is configured such that the pair of left and right guide rings 7e at the beginning end of the downstream side drive route part 1B are, as shown in FIGS. 1C to 4, coupled in an interlocking manner by spur gears 51 rotating coaxially together with the respective guide rings 7e and spur gears 53 engaging with the respective spur gears 51 and rotating together with respect to each other by one transmission shaft 52 so as to rotate with respect to each other in an interlocking manner, and can turn so as to forcibly bring the pair of left and right drive conveyor chains 4 into synchronization therewith.

The storage route part 2 is formed with a pair of left and right drive conveyor chains 17, a pair of left and right chain guide rails 18 which support and guide the drive conveyor chains 17 in the storage route part 2, and a speed reducer equipped motor 19 which rotates and drives the drive conveyor chains 17. The pair of left and right drive conveyor chains 17 are placed horizontally between a pair of left and right guide rings 20a which are pivotally supported on the beginning end side of the upstream side drive route part 1A with respect to the guide ring 7b at the terminal end of the upstream side drive route part 1A and in a position displaced inward and a pair of left and right guide rings 20b which are pivotally supported on the terminal end side of the downstream side drive route part 1B with respect to the guide ring 7e at the beginning end of the downstream side drive route part 1B and in a position displaced inward, the pair of left and right guide rings 20b are coupled in an interlocking manner by a transmission shaft 21 and the speed reducer equipped motor 19 which rotates and drives the transmission shaft 21 is coupled to one end of the transmission shaft 21. The pair of left and right guide rings 20a on the beginning end side of the storage route part 2 serve as a chain tensioning guide ring which adjusts the tension of the drive conveyor chains 17. The storage route part 2 on the upper side of the drive conveyor chains 17 which is supported and guided in the chain guide rails 18 is configured such that the support level of the guide rails 5 placed over the upstream side drive route part 1A and the downstream side drive route part 1B and the upper surface (the support level of the conveyance carriage 3) of the drive conveyor chains 17 supported on the chain guide rails 18 are flush with each other.

The conveyance carriage 3 includes, in two portions on the front and rear sides, pairs of left and right wheels 21a and 21b which have flange portions thereinside. These wheels 21a and 21b are pivotally supported on the outer sides of both left and right side plates 3b which are continuously provided so as to be bent downward from both the left and right sides of a flat rectangular base plate 3a, and in all the wheels 21a and 21b, driven pins 22a and 22b are provided which protrude concentrically outward. On the bottom surface side of the base plate 3a, a pair of front and rear rollers 23a and 23b are pivotally supported on the left and right opposite sides of bearing plates 24a and 24b which are fixed to a center portion in the left/right width direction of the base plate 3a so as to protrude downward. When the conveyance carriage 3 is seen in side view, the pair of front and rear rollers 23a and 23b protrude outward in a forward/backward direction with respect to the pair of front and rear wheels 21a and 21b, and are provided at such a height that the rollers 23a and 23b do not protrude downward with respect to an imaginary plane in contact with the outer circumference of the flange portions of the wheels 21a and 21b. When the conveyance carriage 3 is seen in front view, both the rollers 23a and 23b are symmetrically displaced outward with respect to a vertically-oriented center line of the conveyance carriage 3. A reinforcement plate 25 for reinforcing the base plate 3a is fixed to the bottom surface side of the base plate 3a.

The carriage propulsion claw parts 6 attached to the pair of left and right drive conveyor chains 4 are additionally provided on the inner sides of the pair of left and right drive conveyor chains 4 at the same intervals as the intervals of the front and rear wheels 21a and 21b (the driven pins 22a and 22b) of the conveyance carriage 3 in the travel direction of the conveyance carriage, and are formed in the shape of a letter U which has a driven pin fitting concave portion that is opened upward when turning around the upstream side drive route part 1A and the downstream side drive route part 1B. As described previously, the drive conveyor chains 9 which are provided so as to be stretched on the rising route part 1D are the same as the drive conveyor chains 4 having the carriage propulsion claw parts 6, and it is configured such that, when the drive conveyor chains 9 are driven to rotate with the drive conveyor chains 4 in an interlocking manner, the carriage propulsion claw parts 6 in the vertical route part 9a of the drive conveyor chains 9 move upward in the same direction as the carriage propulsion claw parts 6 directed laterally outward in the vertical route part 4a of the drive conveyor chains 4, while keeping the same height as the carriage propulsion claw part 6, and in synchronization with the carriage propulsion claw part 6.

A horizontal distance between the carriage propulsion claw part 6 in the vertical route part 4a of the drive conveyor chains 4 and the carriage propulsion claw part 6 in the vertical route part 9a of the drive conveyor chains 9 which is present at the same height as the carriage propulsion claw part 6 described above is equal to the interval between the front and rear wheels 21a and 21b (the driven pins 22a and 22b) of the conveyance carriage 3 in the travel direction of the conveyance carriage. Furthermore, as shown in FIGS. 1A and 2, in the rising route part 1D, between the vertical route part 4a of the drive conveyor chains 4 and the vertical route part 9a of the drive conveyor chains 9, a guide plate 26 which includes a guide rail portion 26a for guiding the outer sides of the wheels 21a of the conveyance carriage 3 that moves upward in parallel to the rising route part 1D while keeping an upright posture and a guide rail portion 26b for guiding the inner sides of the wheels 21b of the conveyance carriage 3 is provided so as to stand, and a guide plate 27 which includes a guide rail portion 27a for guiding the outer sides of the wheels 21b of the conveyance carriage 3 is provided outside the vertical route part 9a of the drive conveyor chains 9 so as to stand.

When the conveyance carriage 3 is present in the upstream side drive route part 1A and the downstream side drive route part 1B, as shown in FIG. 6A, the conveyance carriage 3 in an upright posture is supported with the pair of left and right guide rails 5 via the respective wheels 21a and 21b, and at this time, the respective driven pins 22a and 22b of the conveyance carriage 3 are fitted into the driven pin fitting concave portions opened upward in the carriage propulsion claw parts 6 of the pair of left and right drive conveyor chains 4 which move horizontally along the upstream side drive route part 1A and the downstream side drive route part 1B. When the conveyance carriage 3 is present in the return drive route part 10, as shown in FIG. 6B, the conveyance carriage 3 in an upright posture is supported with the pair of left and right guide rails 5 via the respective wheels 21a and 21b, and at this time, the respective driven pins 22a and 22b of the conveyance carriage 3 are fitted into the driven pin fitting concave portions opened downward in the carriage propulsion claw parts 6 of the pair of left and right drive conveyor chains 4 which move along the return drive route part 10 in an upside-down posture. Therefore, the pair of left and right drive conveyor chains 4 are driven to rotate in a predetermined direction by the speed reducer equipped motor 16, and thus, in the upstream side drive route part 1A and the downstream side drive route part 1B, the conveyance carriage 3 in an upright posture can be made to travel in a forward direction in which the wheel 21a precedes whereas in the return drive route part 10, the conveyance carriage 3 in an upright posture can be made to travel in a reverse direction in which the wheel 21b precedes. In the horizontal turning route parts of the pair of left and right drive conveyor chains 4, as shown in FIGS. 6A and 6B, chain guide rails 28 which support and guide the drive conveyor chains 4 are laid.

When the conveyance carriage 3 with the front and rear being reversed is fed out from the return drive route part 10 to the lower end of the rising route part 1D, although the carriage propulsion claw parts 6 of the drive conveyor chains 4 are detached upward from the driven pins 22b of the front wheels 21b, by the carriage propulsion claw parts 6 of the drive conveyor chains 4 which are fitted from above to the driven pins 22a of the rear wheels 21a, the conveyance carriage 3 is pushed out, with the result that the driven pins 22b of the front wheels 21b are fitted into the carriage propulsion claw parts 6 of the drive conveyor chains 9 at the lower end of the vertical route part 9a of the drive conveyor chains 9. Consequently, in the conveyance carriage 3, the driven pins 22a of the rear wheels 21a receive thrust from the carriage propulsion claw part 6 of the drive conveyor chains 4, and the driven pins 22b of the front wheels 21b receive thrust from the carriage propulsion claw part 6 of the drive conveyor chains 9, with the result that the conveyance carriage 3 is pulled up in parallel along the guide rings 7f and 8b at the lower end of the rising route part 1D. Thereafter, the conveyance carriage 3 moves upward in parallel while keeping an upright posture by the carriage propulsion claw parts 6 which are fitted to the front and rear driven pins 22a and 22b, and which are directed horizontally laterally in the vertical route parts 4a and 9a of the drive conveyor chains 4 and 9. At this time, although by the presence of the guide rail portions 26a, 26b, and 27a of the guide plates 26 and 27, the parallel movement of the conveyance carriage 3 from the return drive route part 1C to the rising route part 1D is performed smoothly and reliably, in order to prevent the driven pins 22a of the rear wheels 21a from being detached from the carriage propulsion claw parts 6 of the drive conveyor chains 4 which move upward around the guide ring 7f, it is possible to raise, as the conveyance carriage 3 moves, an end portion of the conveyance carriage 3, where the rear wheels 21a (the driven pins 22a) are present, by a rising gradient cam rail 54 which acts only on the roller 23a located at the midpoint of the pair of left and right wheels 21a on the rear side.

At a point in time when the conveyance carriage 3 reaches the upper end of the rising route part 1D, via the driven pins 22a of the front wheels 21a fitted into the carriage propulsion claw parts 6 of the drive conveyor chains 4 which continuously move from the rising route part 1D to the upstream side drive route part 1A, the conveyance carriage 3 continuously receives thrust from the drive conveyor chains 4 so as to be drawn out to the upstream side drive route part 1A. At this time, the carriage propulsion claw parts 6 of the drive conveyor chains 9 fitted to the driven pins 22b of the wheels 21b on the rear side of the conveyance carriage 3 turn around the guide rings 8a so as to be detached from the driven pins 22b. Then, when the driven pins 22b of the wheels 21b on the rear side reach an area directly above the guide ring 7a at the beginning end of the upstream side drive route part 1A, the carriage propulsion claw parts 6 of the drive conveyor chains 4 located directly after the carriage propulsion claw parts 6 which are fitted to the front driven pins 22a are fitted from below to the driven pins 22b on the rear side, and thus the conveyance carriage 3 is fed out into the upstream side drive route part 1A in a state where the front and rear driven pins 22a and 22b are fitted into the carriage propulsion claw parts 6 of the drive conveyor chains 4.

When the front wheels 21a of the conveyance carriage 3 fed out into the upstream side drive route part 1A reach the area directly above the guide ring 7a at the beginning end of the upstream side drive route part 1A, the wheels 21a are transferred onto the guide rails 5 which are placed along the upstream side drive route part 1A, and the rear wheels 21b are rolled on an upper horizontal guide rail portion 26c following the guide rail portion 26b of the guide plate 26. Since between the upper horizontal guide rail portion 26c of the guide plate 26 and the guide rails 5, the rear wheels 21b become free, until the rear wheels 21b disengaged from the top of the upper horizontal guide rail portion 26c of the guide plate 26 are transferred onto the guide rails 5, as a means for holding the conveyance carriage 3 in a horizontal posture, for example, although not shown, a support roller for supporting both left and right side plates 3b of the conveyance carriage 3 (or a reinforcement plate which is additionally provided so as to be directed in the forward/backward direction in an intermediate position in the left/right width direction of the bottom portion of the conveyance carriage 3 or the like) can be pivotally supported in a position which is outside the movement route of the conveyance carriage 3 that moves parallel from the rising route part 1D to the upstream side drive route part 1A.

The conveyance carriage 3 fed into the upstream side drive route part 1A travels forward toward the storage route part 2 by the pair of left and right drive conveyor chains 4, and is fed out from the upstream side drive route part 1A to the storage route part 2. Although at this time, the driven pins 22a of the front wheels 21a are detached from the carriage propulsion claw parts 6 of the drive conveyor chains 4 in the position of the guide ring 7b at the terminal end of the upstream side drive route part 1A, the conveyance carriage 3 then receives thrust from the carriage propulsion claw parts 6 of the drive conveyor chains 4 fitted to the driven pins 22b of the rear wheels 21b so as to be fed out from the upstream side drive route part 1A to the storage route part 2. As shown in FIG. 6C, the conveyance carriage 3 fed out to the storage route part 2 is supported on the upper surface of the pair of left and right drive conveyor chains 17 which move horizontally in a state where the wheels 21a and 21b of the conveyance carriage 3 are supported on the chain guide rails 18.

Figure 3:
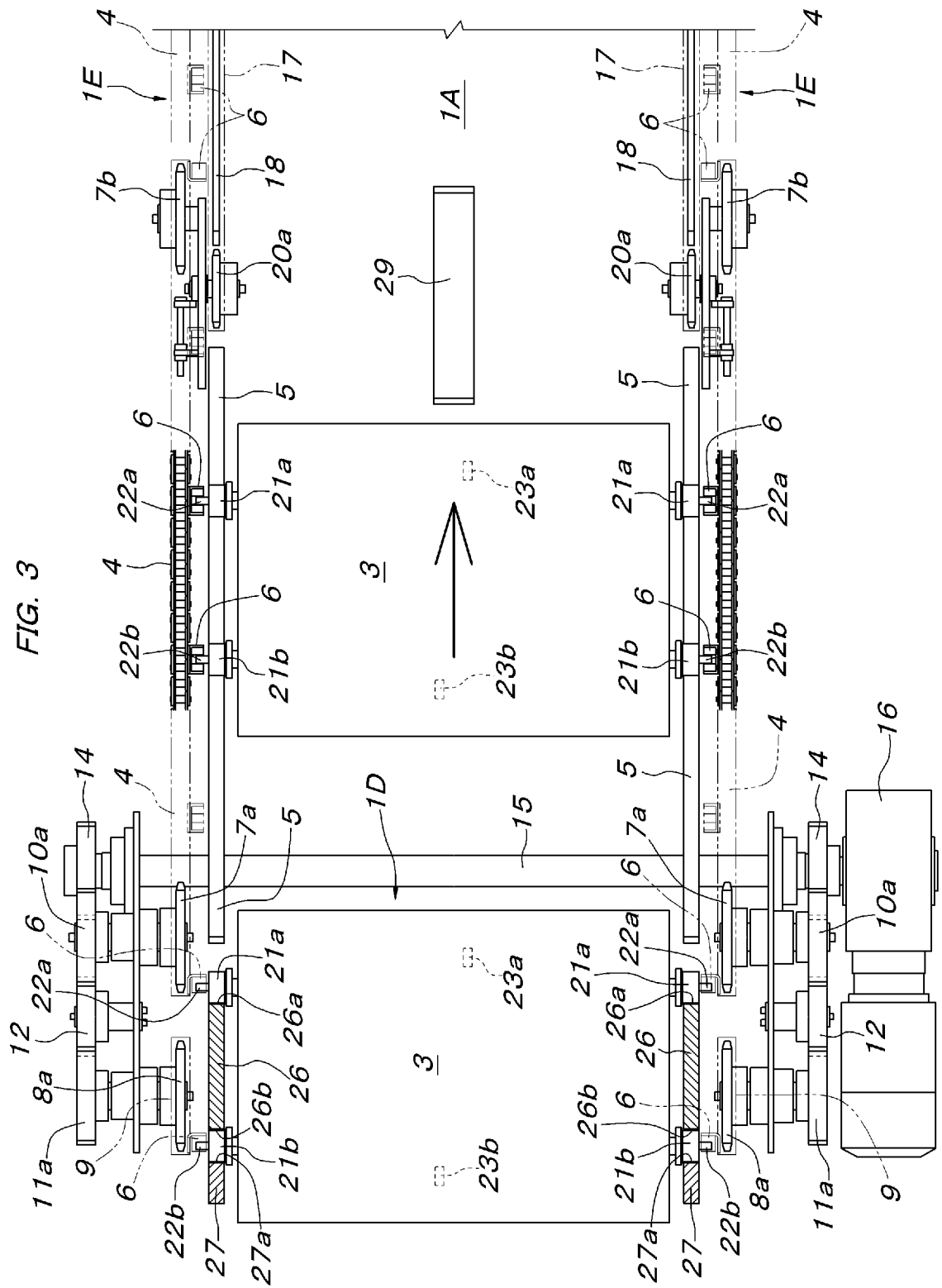
FIG. 3 is a partial cross-sectional plan view showing a portion from the rising route part to a beginning end portion of the storage route part.

Although in the upstream side drive route part 1A, the conveyance carriage 3 is supported on the guide rails 5 which support and guide the wheels 21a and 21b, and in the storage route part 2, the conveyance carriage 3 is supported on the chain guide rails 18 via the drive conveyor chains 17, between the terminal end of the guide rails 5 in the upstream side drive route part 1A and the beginning end of the chain guide rails 18 in the storage route part 2, a region in which the conveyance carriage 3 cannot be supported on the guide rails is produced due to the presence of the guide rings 20a at the beginning end of the storage route part 2. In order to prevent the wheels 21a and 21b of the conveyance carriage 3 from being dropped in this region, as shown in FIG. 3, it is configured such that a support guide plate 29 is placed whose width and length that cover the movement route of the rollers 23a and 23b when the wheels 21a and 21b pass within the region, and thus the front end portion or the rear end portion of the conveyance carriage 3 is temporarily supported by the support guide plate 29 via the rollers 23a and 23b. As shown in FIG. 6C, even in the return route part of the drive conveyor chains 17 below the storage route part 2, chain guide rails 30 for supporting and guiding the drive conveyor chains 17 are laid.

Figure 4:
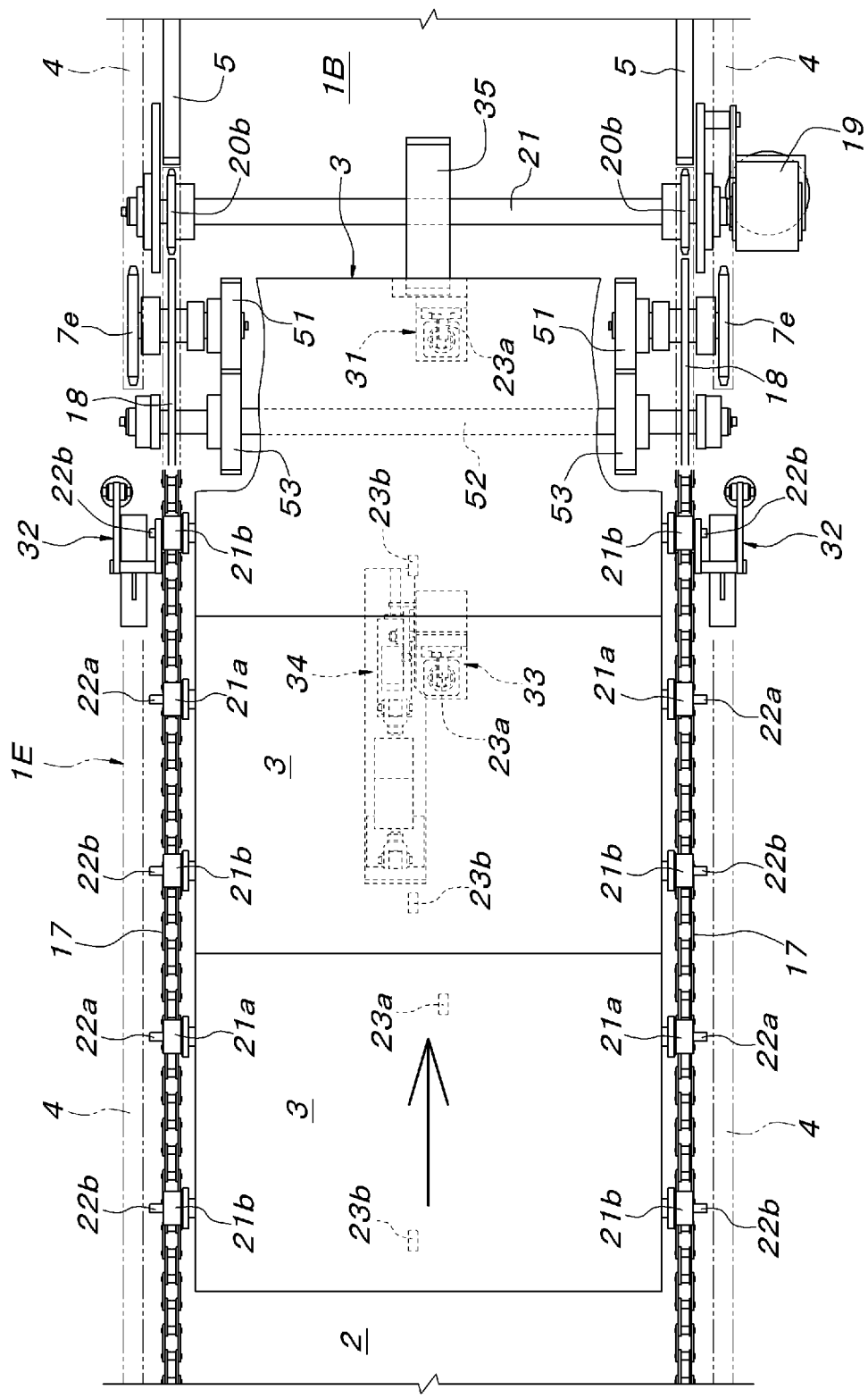
FIG. 4 is a partial cutout plan view of the terminal end portion of the storage route part.
Figure 5A:
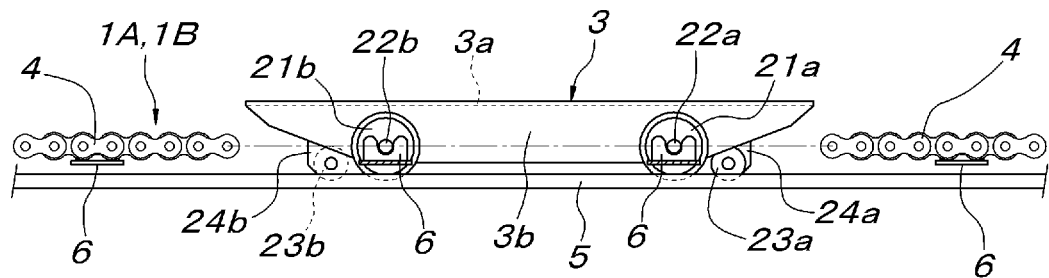
FIG. 5A is a partial cutout side view showing a conveyance carriage in a drive route part and FIG. 5B is a plan view of the conveyance carriage.
Figure 5B:
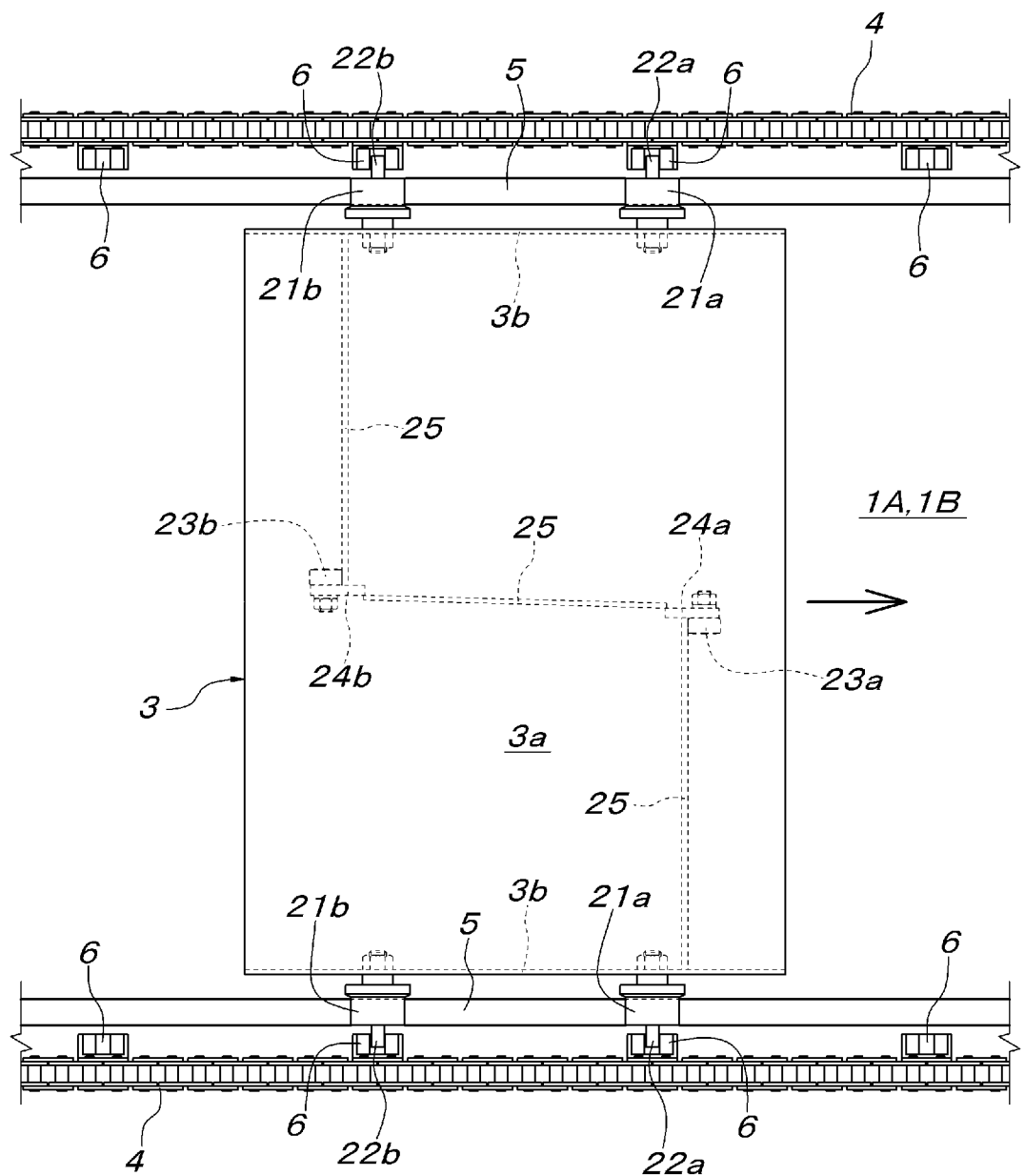
Figure 7A:
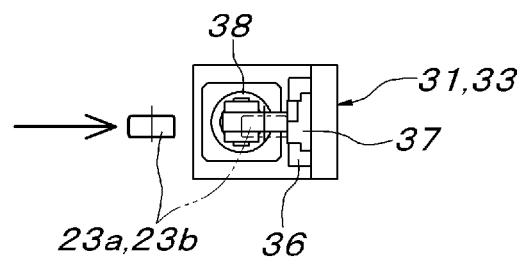
FIG. 7A is a plan view of an auxiliary stopper.
Figure 7B:
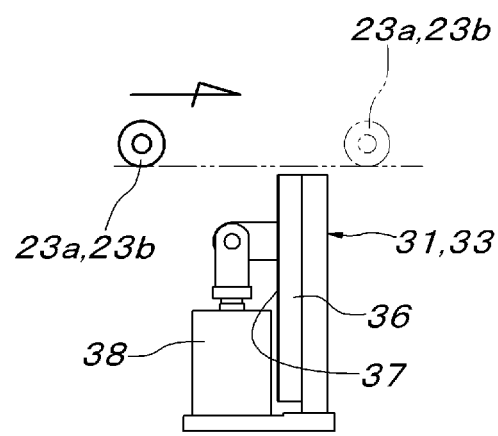
FIG. 7B is a side view showing a non-action state of the auxiliary stopper.
Figure 7C:
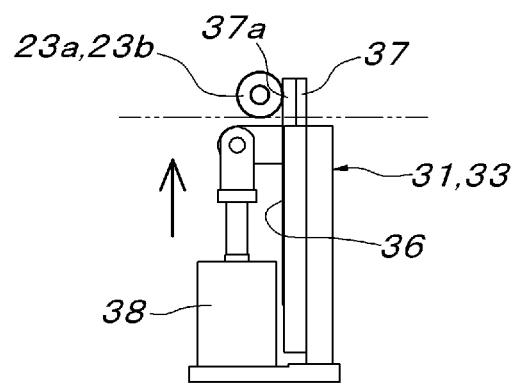
FIG. 7C is a side view showing an action state of the auxiliary stopper.
Figure 8A:
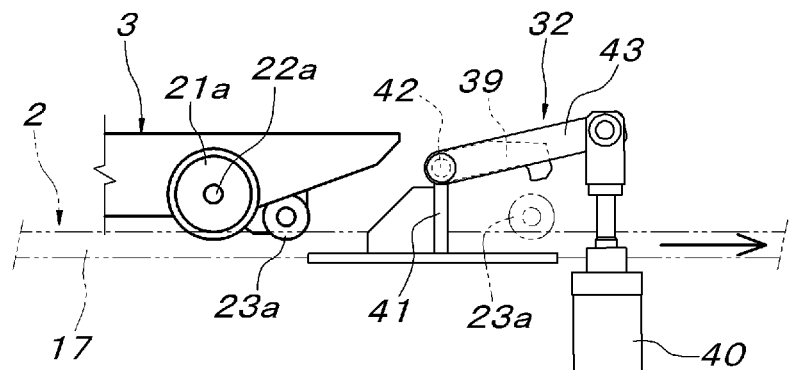
FIG. 8A is a side view showing a non-action state of a main stopper.
Figure 8B:
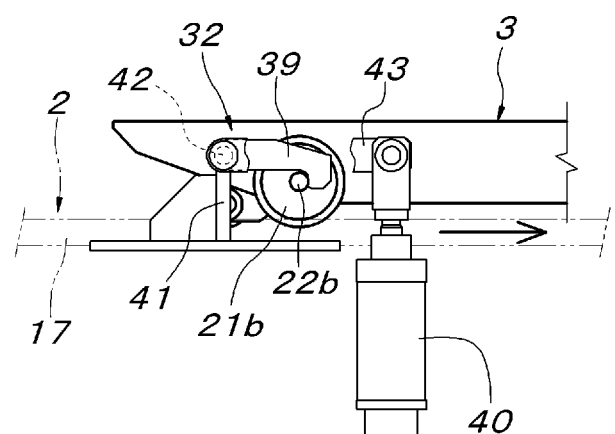
FIG. 8B is a partial cutout side view showing an action state of the main stopper.
Figure 8C:
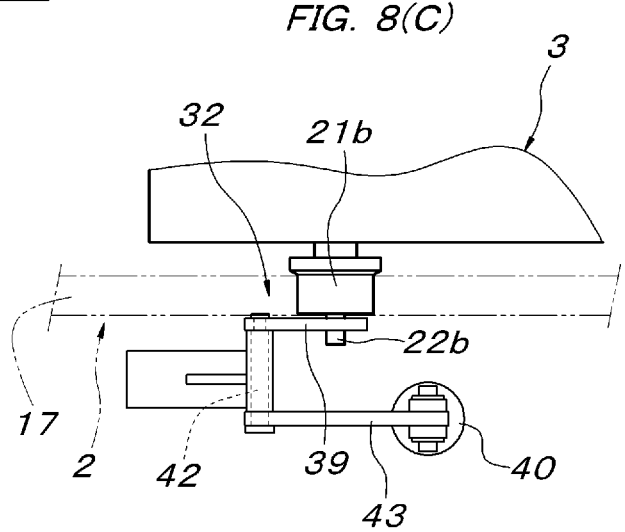
FIG. 8C is a plan view of FIG. 8B.

As shown in FIG. 4, in the terminal end portion of the storage route part 2, an auxiliary stopper 31, a main stopper 32, a following carriage temporary stop stopper 33, a carriage pushing-out means 34, and a support guide plate 35 are arranged. The auxiliary stopper 31 and the following carriage temporary stop stopper 33 have the same structure, and are, as shown in FIG. 7, formed with a raising/lowering main body 37 which is supported on raising/lowering guide rails 36 so as to be freely raised and lowered, and a cylinder unit 38 which drives the raising/lowering main body 37 so as to raise and lower the raising/lowering main body 37. When the raising/lowering main body 37 is raised by the cylinder unit 38 from a lowering limit to a raising limit, an upper end portion of the raising/lowering main body 37 which protrudes upward from the raising/lowering guide rails 36 serves as a stopper portion 37a. The auxiliary stopper 31 is arranged in such a position that when the driven pins 22a of the pair of left and right wheels 21a on the front side of the conveyance carriage 3 propelled by the drive conveyor chains 17 in a forward direction in the storage route part 2 are located directly in front of the turning route of the carriage propulsion claw parts 6 around the guide ring 7e at the beginning end of the downstream side drive route part 1B (see FIG. 10B), as shown in FIG. 10A, the rollers 23a on the front side of the conveyance carriage 3 can be received by the stopper portion 37a. The following carriage temporary stop stopper 33 having the same structure is arranged in such a position that, as shown in FIG. 4, when the front end of the second conveyance carriage 3 (the front end of the base plate 3a) makes contact with the rear end of the front conveyance carriage 3 (the rear end of the base plate 3a), which is stopped at a fixed position by the auxiliary stopper 31 via the front rollers 23a, and stops, the rollers 23a on the front side of the second conveyance carriage 3 can be received by the stopper portion 37a.

The main stopper 32 is formed with a pair of left and right vertical motion hooks 39 which are freely engaged/disengaged with the driven pins 22b of the pair of left and right wheels 21b on the rear side of the front conveyance carriage 3 that is stopped by the auxiliary stopper 31 at the fixed position, and a pair of left and right cylinder units 40 which vertically and individually drive the respective vertical motion hooks 39. The pair of left and right vertical motion hooks 39 extend forward with rear end portions thereof attached to the inner ends of rotation support shafts 42 which are supported by bearing members 41 and which are directed laterally horizontally, and the cylinder units 40 vertically drive operation levers 43 which are attached to the outer ends of the rotation support shafts 42 and which extend forward. By extending the cylinder units 40 to switch, via the operation levers 43 and the rotation support shafts 42, the vertical motion hooks 39 to the non-action posture of an upper movement limit, the vertical motion hooks 39 are retracted to the upper side of the movement route of the respective driven pins 22a and 22b as the conveyance carriage 3 is moved forward whereas the cylinder units 40 are contracted so as to move, via the operation levers 43 and the rotation support shafts 42, the vertical motion hooks 39 in the downward direction, and thus the vertical motion hooks 39 can be switched to a restraint action posture in which hook portions at the tip end portions thereof enter the movement route of the respective driven pins 22a and 22b.

Figure 9A:
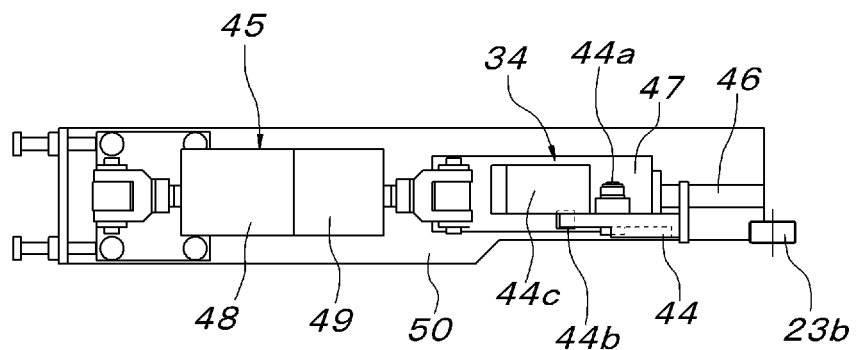
FIG. 9A is a plan view of a carriage pushing-out means and FIG. 9B is a side view of the carriage pushing-out means.
Figure 9B:
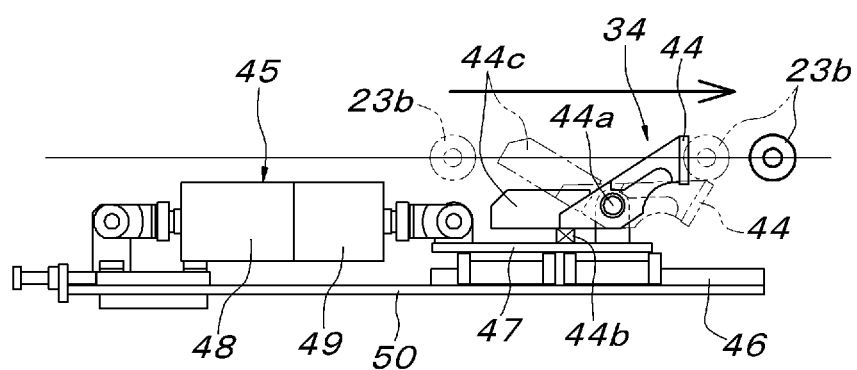

The carriage pushing-out means 34 is provided parallel to the following carriage temporary stop stopper 33, and is, as shown in FIG. 9, formed with a pusher 44 and a drive means 45 which moves the pusher 44 forward and backward. The pusher 44 is pivotally supported, on a movable base 47 supported so as to freely move forward and backward on a slide rail 46 laid so as to be directed horizontally and forward and backward, such that the pusher 44 freely vertically move around a support shaft 44a directed laterally horizontally. On the movable base 47, a stopper member 44b is additionally provided which receives the rear end portion of the pusher 44 when the pusher 44 is in a pushing-from-the-rear action posture in which the pusher 44 stands obliquely forward and upward from the support shaft 44a, and furthermore, in order to bias the pusher 44 into the pushing-from-the-rear action posture described above, a front end portion of a weight block 44c is fixed to the side surface of the rear end portion of the pusher 44.

As shown in FIG. 4, the carriage pushing-out means 34 is arranged in such a position that when the movable base 47 (the pusher 44) is in a retract limit position, the pusher 44 which is biased so as to be held in the pushing-from-the-rear action posture slightly behind the rollers 23b on the rear side of the front conveyance carriage 3 that is stopped by the auxiliary stopper 31 at the fixed position enters the movement route of the rear rollers 23b as the conveyance carriage 3 moves forward. The pusher 44 which is biased so as to be held in the pushing-from-the-rear action posture is pushed forward by the rollers 23b on the rear side of the conveyance carriage 3 that moves forward, and thus the pusher 44 is, as indicated by imaginary lines in FIG. 9B, pushed down into a forward tilted posture around the support shaft 44a against gravity acting on the weight block 44c so as to allow the passage of the rear rollers 23b, whereas, after the passage of the rear rollers 23b, the pusher 44 returns to and is held in the original pushing-from-the-rear action posture by gravity acting on the weight block 44c. In the drive means 45, a first cylinder unit 48 which moves forward the movable base 47 (the pusher 44) from the retract limit position P0 to a first forward limit position P1 and a second cylinder unit 49 which moves forward the movable base 47 (the pusher 44) from the first forward limit position P1 to a second forward limit position P2 are coupled and integrated such that the piston rods thereof extend in opposite directions. One of the piston rods in the cylinder units 48 and 49 which protrude from both ends is pivotally supported on a base 50 on which the slide rail 46 is laid, and the other piston rod is pivotally supported so as to be coupled to the movable base 47.

As described previously, the conveyance carriage 3 which is fed out onto the storage route part 2 from the upstream side drive route part 1A by the drive conveyor chains 4 moves forward on the storage route part 2 as the drive conveyor chains 17 turn in a state where the wheels 21a and 21b are supported on the pair of left and right drive conveyor chains 17 forming the storage route part 2. On the other hand, as shown in FIG. 10A, the auxiliary stopper 31 which is present at the terminal end portion of the storage route part 2 is switched by the cylinder unit 38 to a raising limit position at which the stopper portion 37a can receive the rollers 23a on the front side of the conveyance carriage 3, and in the main stopper 32 in front thereof, the pair of left and right vertical motion hooks 39 are switched by the cylinder units 40 to the non-action posture of the upper movement limit. Furthermore, in the carriage pushing-out means 34, the pusher 44 which is biased so as to be held in the pushing-from-the-rear action posture is brought, by the movable base 47, into a state where the pusher 44 is on standby in the retract limit position. Although not shown in FIG. 10, the following carriage temporary stop stopper 33 is switched to a non-action state where the stopper portion 37a exits downward from the movement route of the rollers 23a on the front side of the conveyance carriage 3.

Under the conditions described above, when the front rollers 23a are passed above the following carriage temporary stop stopper 33, the driven pins 22a of the pair of left and right wheels 21a on the front side are passed below the pair of left and right vertical motion hooks 39 in the non-action posture of the upward movement limit of the main stopper 32, then the rear rollers 23b are passed while pushing down the pusher 44 in the retract limit position of the carriage pushing-out means 34 into the forward tilted posture and thereafter the front rollers 23a are received by the stopper portion 37a of the raising/lowering main body 37 which is present in the upward movement limit of the auxiliary stopper 31, with the result that, as shown in FIGS. 4 and 10A, the conveyance carriage 3 which moves forward toward the terminal end by the drive conveyor chains 17 in the storage route part 2 is stopped at the terminal end fixed position of the storage route part 2. When the front conveyance carriage 3 is stopped at the terminal end fixed position of the storage route part 2, as shown in FIG. 10B, the pair of left and right vertical motion hooks 39 in the non-action posture of the upward movement limit of the main stopper 32 are individually switched by the cylinder units 40 to the action posture of the downward movement limit so as to be engaged with the driven pins 22b of the pair of left and right wheels 21b on the rear side of the conveyance carriage 3. Thereafter, the raising/lowering main body 37 of the auxiliary stopper 31 is lowered by the cylinder unit 38 to the lowering limit, and thus the stopper portion 37a thereof is retracted downward from the movement route of both the rollers 23a and 23b on the front and rear sides of the conveyance carriage 3.

Then, as shown in FIG. 10B, the first cylinder unit 48 of the drive means 45 is operated to extend such that the pusher 44 of the carriage pushing-out means 34 moves forward via the movable base 47 by a stroke S1 and is switched from the retract limit position P0 to the first forward limit position P1. With the pair of left and right vertical motion hooks 39 in the main stopper 32, the pusher 44 which reaches the first forward limit position P1 blocks, via the rear rollers 23b, the backward movement of the front conveyance carriage 3 whose forward movement from the terminal end fixed position of the storage route part 2 is blocked. Consequently, at the terminal end fixed position of the storage route part 2, the conveyance carriage 3 is sandwiched, forward and backward, by the pair of left and right vertical motion hooks 39 in the main stopper 32 and the pusher 44 of the carriage pushing-out means 34, and thus the conveyance carriage 3 is positioned in a state where the conveyance carriage 3 is prevented from being moved forward and backward. Although the drive conveyor chains 17 of the storage route part 2 are continuously driven so as to move forward on the chain guide rails 18, the drive conveyor chains 17 move to pass the conveyance carriage 3 whose forward movement is stopped by the auxiliary stopper 31 and the main stopper 32 as described above, while making the wheels 21a and 21b of the conveyance carriage 3 rotate in a backward direction.

In the state where the conveyance carriage 3 is positioned at the terminal end fixed position of the storage route part 2 as described above so as to be prevented from being moved forward and backward, the driven pins 22a of the pair of left and right wheels 21a on the front side of the conveyance carriage 3 and the carriage propulsion claw parts 6 of the drive conveyor chains 4 which are turned around the guide ring 7e at the beginning end of the downstream side drive route part 1B so as to enter the downstream side drive route part 1B do not interfere with each other, with the result that the conveyance carriage 3 can be kept stopped at the terminal end fixed position of the storage route part 2 until an arbitrary time. On the other hand, each conveyance carriage 3 which follows the front conveyance carriage 3 that is stopped at the terminal end fixed position of the storage route part 2 is stopped in a position where the front end thereof (the front end of the base plate 3a) makes contact with the rear end of the conveyance carriage 3 which is stopped directly in front thereof (the rear end of the base plate 3a) and stops, and only the drive conveyor chains 17 continue to move forward.

Figure 11A:
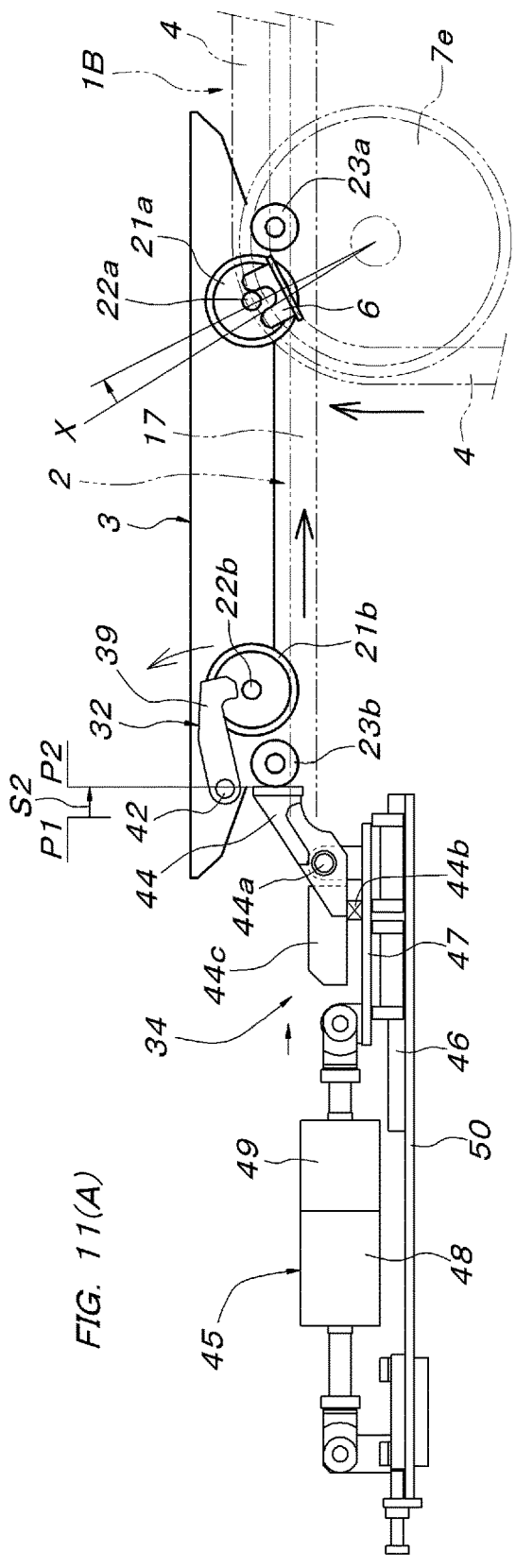
FIG. 11A is a side view showing a first stage when the conveyance carriage is fed out from the storage route part and FIG. 11B is a side view showing a third stage thereof.

When the front stopped conveyance carriage 3 which is stopped at the terminal end fixed position of the storage route part 2 is fed into the downstream side drive route part 1B, as shown in FIG. 10B, when the carriage propulsion claw parts 6 of the drive conveyor chains 4 which are turned around the guide ring 7e at the beginning end of the downstream side drive route part 1B so as to enter the downstream side drive route part 1B reach, by pushing out the front stopped conveyance carriage 3, a fixed position X where the driven pins 22a of the pair of left and right wheels 21a on the front side of the front stopped conveyance carriage 3 can be fitted into the carriage propulsion claw parts 6, as shown in FIG. 11A, the pair of left and right vertical motion hooks 39 in the main stopper 32 are switched by the cylinder units 40 to the non-action posture of the upper movement limit, and simultaneously, the second cylinder unit 49 in the drive means 45 of the carriage pushing-out means 34 is operated to extend such that the pusher 44 in the first forward limit position P1 is moved forward together with the movable base 47 by a stroke S2, and thus the first forward limit position P1 is switched to the second forward limit position P2.

Figure 11B:
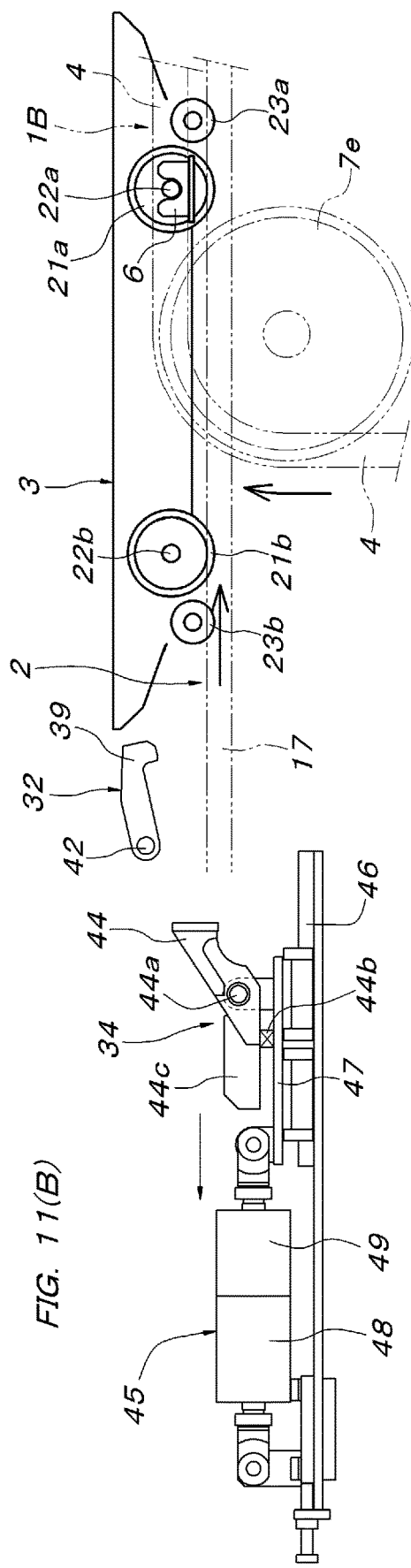

By the operation described above, the front stopped conveyance carriage 3 is moved forward by the stroke S2 via the rear rollers 23b by the pusher 44 of the carriage pushing-out means 34, and thus the driven pins 22a of the pair of left and right wheels 21a on the front side of the front stopped conveyance carriage 3 are fitted into the carriage propulsion claw parts 6 of the drive conveyor chains 4 which are moved forward from the fixed position X into the downstream side drive route part 1B around the guide ring 7e so as to be forcibly pushed thereinto. Thereafter, as shown in FIG. 11B, the front stopped conveyance carriage 3 receives thrust from the carriage propulsion claw parts 6 of the drive conveyor chains 4 via the pair of left and right driven pins 22a, and the front stopped conveyance carriage 3 is drawn into the downstream side drive route part 1B. Then, when the driven pins 22b of the pair of left and right wheels 21b on the rear side of the conveyance carriage 3 pass above the guide ring 7e, the driven pins 22b are fitted into the carriage propulsion claw parts 6 directly after the carriage propulsion claw parts 6 which are fitted to the front driven pins 22a. The conveyance carriage 3 which is drawn into the downstream side drive route part 1B in this way travels forward on the downstream side drive route part 1B by the carriage propulsion claw parts 6 of the drive conveyor chains 4 in the same manner as when the conveyance carriage 3 travels forward in the upstream side drive route part 1A in a state where the wheels 21a and 21b are supported on the guide rails 5.

Between the terminal end of the chain guide rails 18 supporting the conveyance carriage 3 via the drive conveyor chains 17 in the storage route part 2 and the beginning end of the guide rails 5 supporting the conveyance carriage 3 via the wheels 21a and 21b of the conveyance carriage 3 in the downstream side drive route part 1B, a region in which the conveyance carriage 3 cannot be supported on the guide rails is produced due to the presence of the guide rings 20b at the terminal end of the storage route part 2. In order to prevent the wheels 21a and 21b of the conveyance carriage 3 from being dropped in this region, as shown in FIG. 4, it is configured such that a support guide plate 35 is placed whose width and length that cover the movement route of the rollers 23a and 23b when the wheels 21a and 21b pass within the region, and thus the front end portion or the rear end portion of the conveyance carriage 3 is temporarily supported by the support guide plate 35 via the rollers 23a and 23b.

When the action of drawing the front stopped conveyance carriage 3 into the downstream side drive route part 1B is started by the carriage propulsion claw parts 6 of the drive conveyor chains 4 in the downstream side drive route part 1B, as shown in FIG. 11B, the pusher 44 of the carriage pushing-out means 34 is moved backward by the contraction operation of both the first cylinder unit 48 and the second cylinder unit 49 in the drive means 45 together with the movable base 47 from the second forward limit position P2 to the original retract limit position P0. In the front conveyance carriage 3 which moves forward toward the terminal end fixed position of the storage route part 2, in an appropriate time after the rollers 23a are passed forward through the position of the following carriage temporary stop stopper 33 until the front stopped conveyance carriage 3 is pushed out to the second forward limit position P2 by the carriage pushing-out means 34, the raising/lowering main body 37 of the following carriage temporary stop stopper 33 is raised up to the upward movement limit so as to switch the stopper portion 37a thereof to a restraint action position at which the stopper portion 37a enters the movement route of the rollers 23a on the front side of the conveyance carriage 3.

Consequently, when the second conveyance carriage 3 following the front stopped conveyance carriage 3 makes contact with the rear end of the front stopped conveyance carriage 3 and stops, the rollers 23a on the front side of the second conveyance carriage 3 are located in a position directly before the stopper portion 37a which is present in the restraint action position of the following carriage temporary stop stopper 33. Therefore, it is possible to prevent the second conveyance carriage 3 from following the front stopped conveyance carriage 3 by the drive conveyor chains 17 of the storage route part 2 so as to travel forward as the front stopped conveyance carriage 3 moves forward when the front stopped conveyance carriage 3 is fed into the downstream side drive route part 1B as described above. When the second conveyance carriage 3 is fed into the terminal end fixed position of the storage route part 2, it suffices that a preparation for stopping the front conveyance carriage 3 at the terminal end fixed position of the storage route part 2 as described above is made, the raising/lowering main body 37 of the following carriage temporary stop stopper 33 is lowered by the cylinder unit 38, the stopper portion 37a thereof is retracted downward from the movement route of the rollers 23a on the front side of the conveyance carriage 3, and the second conveyance carriage 3 is moved forward by the drive conveyor chains 17 of the storage route part 2. In other words, unless the front conveyance carriage 3 which is stopped in the terminal end of the storage route part 2 is fed out to the downstream side drive route part 1B, the subsequent conveyance carriages 3 can be stored on the storage route part 2 in a state where they are sequentially connected in a bumper-to-bumper manner.

As described above, by feeding out the front conveyance carriage 3 which was temporarily stopped in the terminal end of the storage route part 2 to the downstream side drive route part 1B with predetermined timing, it is possible to drive the front conveyance carriage 3 continuously by the carriage propulsion claw parts 6 of the drive conveyor chains 4 in the downstream side drive route part 1B without being stopped at the beginning end portion of the downstream side drive route part 1B, with the result that the front conveyance carriage 3 can be smoothly moved forward on the guide rails 5 in the downstream side drive route part 1B. Therefore, by changing, as necessary, the timing at which the front conveyance carriage 3 which was temporarily stopped in the terminal end of the storage route part 2 is fed out to the downstream side drive route part 1B, it is possible to arbitrarily change the interval between the individual conveyance carriages 3 which are moved forward in the storage route part 2.

The embodiment of the present invention is not limited to the configuration described above. That is, although the carriage positioning means which positions the conveyance carriage 3 at the terminal end fixed position of the storage route part 2 in a state where the conveyance carriage 3 is prevented from being moved forward and backward and which freely releases the positioning is formed with the main stopper 32, the pusher 44 of the carriage pushing-out means 34, and the first cylinder unit 48 for switching the pusher 44 from the retract limit position P0 to the first forward limit position P1, a dedicated pusher other than the pusher 44 of the carriage pushing-out means 34 may be provided. Although as the stopper which receives the conveyance carriage 3 at the terminal end fixed position of the storage route part 2, the auxiliary stopper 31 and the main stopper 32 are provided, the present embodiment can also be implemented with only either of the stoppers. In this case, instead of a stopper which receives one place of the center portion in the left/right width direction of the conveyance carriage 3, a stopper which receives two portions on the left and right sides of the conveyance carriage 3 located symmetrically is preferably used. Furthermore, although as the pusher which sandwiches the conveyance carriage 3 with the stopper for receiving the conveyance carriage 3 at the terminal end fixed position of the storage route part 2 so as to position the conveyance carriage 3, the pusher is used which pushes forward the rear rollers 23b of the rollers 23a and 23b provided in two portions on the front and rear sides of the bottom portion of the conveyance carriage 3, a target portion on the side of the conveyance carriage 3 which is pushed by the pusher may be any portion.

A conveyance device using a carriage according to the present invention can be utilized as a conveyance device in which a storage route part for temporarily stopping a conveyance carriage partway through a conveyance route where a conveyed object is conveyed while being supported on the conveyance carriage and changing a timing at which the conveyed object is fed out to a downstream side conveyance route is provided.

What is claimed is:

1. A conveyance device using a carriage, comprising:
    a horizontal travel route having a storage route part for storing conveyance carriages in a state where the conveyance carriages are adjacent in a forward/backward direction and a drive route part for causing the conveyance carriages fed out from the storage route part to be forcibly driven to travel at set intervals;
    the storage route part having drive conveyor chains that support the conveyance carriages via wheels of the conveyance carriages, such that the conveyance carriages travel freely;
    the drive route part having guide rails that support the conveyance carriages via the wheels, such that the conveyance carriages travel freely, and drive cord-like bodies that include, at regular intervals, carriage propulsion claw parts into which driven pins provided in the conveyance carriages and directed laterally horizontally are fitted such that the driven pins are freely fitted and detached into and from the carriage propulsion claw parts;
    the driven pins of a conveyance carriage that is fed from the storage route part into the drive route part with predetermined timing are fitted into the carriage propulsion claw parts that are turned around guide rings at a beginning of the drive route part; and
    a carriage positioning means to position a conveyance carriage, via the driven pins, at a fixed position directly before a turning route around the guide rings of the carriage propulsion claw parts, such that the conveyance carriage is prevented from being moved forward and backward and in which the positioning is freely released; and
    a carriage pushing-out means to push out the conveyance carriage at the fixed position at a timing when the driven pins are fitted into the carriage propulsion claw parts;
    where the carriage positioning means and the carriage pushing-out means are provided separately from the drive conveyor chains of the storage route part.

2. The conveyance device using a carriage according to claim 1, wherein:
    the carriage positioning means includes a stopper which freely switches between an action position for restraining a forward movement of the conveyance carriage and a non-action position for allowing the forward movement of the conveyance carriage, and a pusher which pushes the conveyance carriage so as to position the conveyance carriage between the pusher and the stopper in the action position.

3. The conveyance device using a carriage according to claim 2, wherein:
    the pusher moves forward from a first forward limit position for positioning the conveyance carriage at the fixed position between the pusher and the stopper in the action position to a second forward limit position for pushing out the conveyance carriage from the fixed position in a state where the stopper is switched to the non-action position, and the pusher also serves as the carriage pushing-out means.

4. The conveyance device using a carriage according to claim 2, wherein:
    a pair of the stoppers on left and right sides are provided so as to receive two left and right portions on a rear end side of the conveyance carriage.

5. The conveyance device using a carriage according to claim 4, wherein:
    in each of the wheels provided as left and right pairs in two front and rear portions of the conveyance carriage, a pin is provided so as to protrude outward and concentrically;
    the pins which are provided so as to protrude from the pair of left and right wheels on a front side form the driven pins; and
    the pins which are provided so as to protrude from the pair of left and right wheels on a rear side are targets with which the stoppers are engaged.

6. The conveyance device using a carriage according to claim 4, wherein:
    an auxiliary stopper which receives a center portion in a left/right width direction of the conveyance carriage on a front end side is provided separately from the pair of left and right stoppers.

7. The conveyance device using a carriage according to claim 1,
    wherein:
    rollers are provided in center portions of both front and rear end portions in the conveyance carriage, in a left/right width direction of a bottom portion, and the rollers are pivotally supported with support shafts that are directed laterally horizontally; and
    a support guide plate is placed which supports the conveyance carriage via the rollers while the wheels of the conveyance carriage disengaged from tops of the drive cord-like bodies of the storage route part are transferred onto the guide rails of the drive route part.

8. The conveyance device using a carriage according to claim 1,
    wherein;
    in front of the storage route part, an upstream side drive route part which has a same configuration as the drive route part is also provided; and
    in a state where the wheels of an upstream conveyance carriage which reaches a terminal end portion of the upstream side drive route part are supported on the drive cord-like bodies of the storage route part, the carriage propulsion claw parts which are turned around guide rings at a terminal end of the upstream side drive route part are detached from the driven pins of the upstream conveyance carriage.

9. The conveyance device using a carriage according to claim 7,
    wherein:
    in the conveyance carriage, the rollers which are pivotally supported with the support shafts that are directed laterally horizontally are provided in the center portions of both the front and rear end portions thereof in the left/right width direction of the bottom portion; and
    a support guide plate is placed which supports the conveyance carriage via the rollers while the wheels of the conveyance carriage disengaged from tops of guide rails of the upstream side drive route part are transferred onto the drive cord-like bodies of the storage route part.

* * * * *